Nov. 22, 1955

A. W. HARKNESS 2,724,121

FLUSH VALVE BALL CAGE

Filed Jan. 18, 1954

Andrew W. Harkness
INVENTOR.

United States Patent Office 2,724,121
Patented Nov. 22, 1955

2,724,121

FLUSH VALVE BALL CAGE

Andrew W. Harkness, Glens Falls, N. Y.

Application January 18, 1954, Serial No. 404,616

2 Claims. (Cl. 4—52)

This invention relates to a flush valve ball cage, and more specifically provides a device for retaining the valve ball in correct position over the valve ball seat for guiding the valve ball onto the seat upon discharge of the water in the toilet tank through the discharge pipe after the valve ball has been lifted off the valve ball seat.

An object of this invention is to provide a flush valve ball cage for guiding the movement of the valve ball.

Another object of this invention is to provide a flush valve ball cage having an internally threaded member for attachment to the externally threaded pipe and a pair of right angularly arranged U-shaped members forming a cage for the valve ball.

Still another object of this invention is to provide a flush valve ball cage having a pair of flexible U-shaped members forming a cage that may be partially deformed to permit access to the interior of the cage for replacement of the valve ball.

A still further object of this invention is to provide a flush valve ball cage, which is simple in construction, easy to attach to toilet tanks, efficient in operation, well adapted for its purposes and relatively inexpensive to manufacture.

Figure 1:
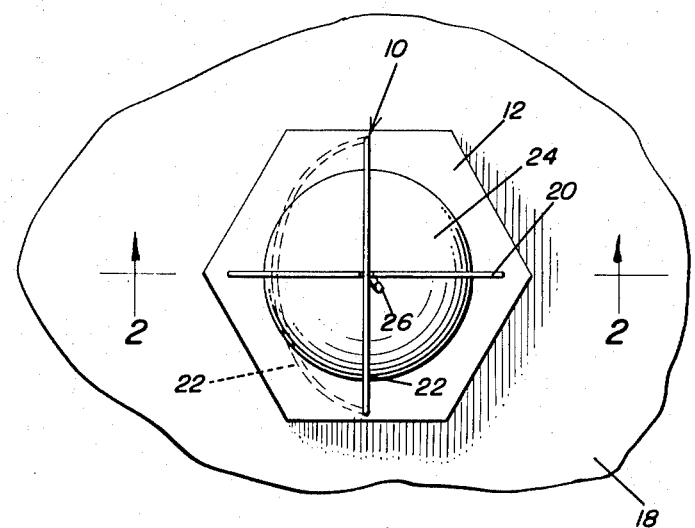
Figure 2:
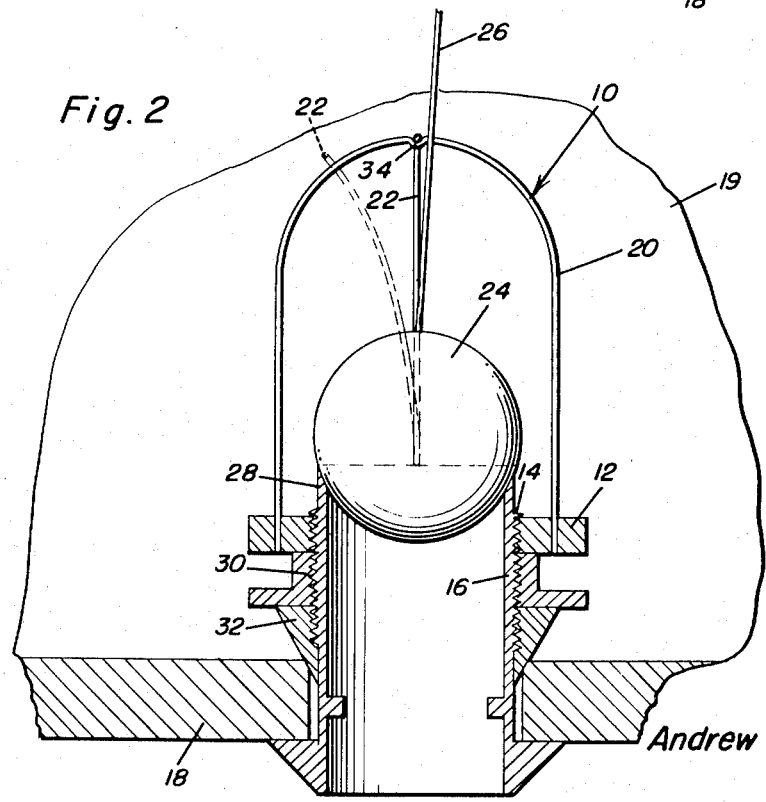

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view of the flush valve ball cage of the present invention; and Figure 2 is a detail, vertical section, taken substantially along section line 2—2 of Figure 1, showing the details of construction of the flush valve ball cage and the discharge outlet in the bottom of the toilet tank.

Referring now specifically to the drawings, it will be seen that the numeral 10 generally designates the flush valve ball cage of the present invention and includes a nut 12 being internally threaded at 14 for detachable positioning on the externally threaded discharge pipe 16 secured to the bottom 18 of the toilet tank 19. A pair of U-shaped members 20 and 22 have free ends of their legs rigidly secured to the nut 12 by any suitable means such as riveting or the like. The U-shaped members 20 and 22 form a skeleton cage for guiding the movement of the flush valve ball 24. The valve ball 24 is attached to the conventional lift arm with a flexible member 26 for raising the valve ball from the valve ball seat 28. The discharge pipe 16 is secured to the bottom 18 by the usual clamp nut 30 having a rubber washer or gasket 32 positioned between the nut 30 and the bottom 18 of the tank 19 thereby positioning the discharge pipe in the bottom 18 in water-tight relation. The upper end of the U-shaped member 20 is provided with an indentation 34 for receiving the bight portion of the U-shaped member 22 in detachable relation. It will be seen that the U-shaped member 22 may be disengaged from the U-shaped member 20 and due to its inherent resilient construction, the U-shaped member 22 may be flexed to one side thereby permitting the ball valve 24 to be replaced.

The operation of the device will be readily understood.

The cage 10 having the U-shaped members 20 and 22 disposed in right angular relation to each other and having their bight portions engaged by utilizing the interconnecting notch 34 and the free ends of the legs rigidly secured to the nut 12 is positioned on the discharge pipe 16 by engaging the internal threads 14 on the nut 12 with the external threads on the discharge outlet 16. When it is desired to place the valve ball 24 in the cage or remove the ball 24 for replacement, the bight portion of the U-shaped member 22 is disengaged from the notch 34 on the bight portion of the U-shaped member 20 and flexed to one side thereof, thereby permitting the ball 24 to be passed through the cage. It will be seen that the skeleton cage 10 of the present invention does not interfere with the discharge flow of water through the outlet 16 and the device may be constructed of material which is non-corrosive and inherently resilient. It will be understood that this device is especially designed for use in flush valve outlets which do not employ the usual overflow pipe and its construction. However, the flush valve ball cage 10 may be utilized wherever desired.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A flush valve ball cage comprising an internally threaded annular member adapted to be secured to an externally threaded discharge pipe in the bottom of a toilet tank, and a pair of resiliently flexible U-shaped members having the free ends of their leg members secured to said annular member, said U-shaped members having bight portions arranged in right angular relation, said bight portions being resiliently movable in relation to each other for permitting the passage of a valve ball therethrough.

2. A flush valve ball cage comprising an internally threaded annular member adapted to be secured to an externally threaded discharge pipe in the bottom of a toilet tank, and a pair of resiliently flexible U-shaped members having the free ends of their leg members secured to said annular member, said U-shaped members having bight portions arranged in right angular relation, said bight portions being resiliently movable in relation to each other for permitting the passage of a valve ball therethrough, the bight portion of one of said U-shaped members being provided with an indented notch for releasably retaining the bight portion of the other U-shaped member in position.

References Cited in the file of this patent

UNITED STATES PATENTS

| | | |
|---|---|---|
| 1,054,940 | Rea | Mar. 4, 1913 |
| 1,237,109 | Shoppe | Aug. 14, 1917 |
| 1,799,770 | Wegner | Apr. 7, 1931 |
| 2,650,369 | Alliss | Sept. 1, 1953 |